United States Patent
Post

(10) Patent No.: US 6,546,426 B1
(45) Date of Patent: Apr. 8, 2003

(54) METHOD AND APPARATUS FOR EFFICIENTLY PROCESSING AN AUDIO AND VIDEO DATA STREAM

(75) Inventor: Lauren Lee Post, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 08/821,938

(22) Filed: Mar. 21, 1997

(51) Int. Cl.$^7$ ............................. G06F 15/16; H04N 7/04
(52) U.S. Cl. ......................................... 709/231; 725/89
(58) Field of Search ................................ 709/219, 231, 709/248; 725/89

(56) References Cited

U.S. PATENT DOCUMENTS

| | | | |
|---|---|---|---|
| 4,994,912 A | 2/1991 | Lumelsky et al. | 358/140 |
| 5,289,276 A | 2/1994 | Siracusa et al. | 348/467 |
| 5,473,385 A | 12/1995 | Leske | 348/500 |
| 5,483,287 A | 1/1996 | Siracusa | 348/426 |
| 5,502,493 A | 3/1996 | Meyer | 348/426 |
| 5,510,845 A | 4/1996 | Yang et al. | 348/476 |
| 5,515,107 A | 5/1996 | Chiang et al. | 348/473 |
| 5,548,704 A | 8/1996 | Steiner et al. | 395/158 |
| 5,555,024 A | 9/1996 | Limberg | 348/473 |
| 5,555,275 A | 9/1996 | Oshima | 375/261 |
| 5,559,999 A | 9/1996 | Maturi et al. | 395/550 |
| 5,576,902 A | 11/1996 | Lane et al. | 386/68 |
| 5,583,652 A | 12/1996 | Ware | 386/75 |
| 5,598,352 A * | 1/1997 | Rosenau et al. | |
| 5,629,740 A * | 5/1997 | Tanaka et al. | |
| 5,630,005 A * | 5/1997 | Ort | |
| 5,715,176 A * | 2/1998 | Mobini | 709/231 |
| 5,737,531 A * | 4/1998 | Ehley | 709/231 |
| 5,758,076 A * | 5/1998 | Wu et al. | 709/231 |
| 5,784,572 A * | 7/1998 | Rostoker et al. | 709/231 |
| 5,793,980 A * | 8/1998 | Glaser et al. | 709/231 |

OTHER PUBLICATIONS

Information technology—Coding of moving pictures and associated audio for digital storage media at up to about 1,5 Mbit/s—Part 1: Systems; International Standard 11172; First edition, 1993.

Information Technology—Generic Coding Of Moving Pictures And Associated Audio Information: Video; Draft International Standard 0802; Nov. 9, 1994.

Information Technology—Generic Coding of Moving Pictures And Associated Audio: Systems; Draft International Standard 0801; revised Apr. 21, 1995.

OpenMPEG™ Multiplatform MPEG Interactive API Specification Version 1.03; OpenMPEG Consortium; May 9, 1996.

* cited by examiner

Primary Examiner—Mark H. Rinehart
Assistant Examiner—Marc D. Thompson
(74) Attorney, Agent, or Firm—Duke W. Yee; Jeffrey S. LaBaw

(57) ABSTRACT

A method and apparatus for processing a data stream including audio and video data in which high data rates and throughput is required. Thresholds are employed to control the processing of video and audio data in a data stream. Video data is decoded in response to a comparison of audio and video data to threshold values. Additionally, another threshold value is employed to control buffers storing audio data in response to an underflow of audio data.

25 Claims, 11 Drawing Sheets

METHOD AND APPARATUS FOR EFFICIENTLY PROCESSING AN AUDIO AND VIDEO DATA STREAM

BACKGROUND OF THE INVENTION

1. Technical Field

The present invention relates generally to an improved data processing system and in particular to a method and apparatus for processing a data stream in a data processing system. Still more particularly, the present invention relates to a method and apparatus for processing a data stream including audio and video data.

2. Description of the Related Art

Multimedia, the presentation or transfer of information through more than one medium at any time, is a fast growing segment of the computer industry with many applications being developed, which incorporate various features of multimedia. Additionally, many businesses are using multimedia to present information to consumers. Multimedia combines different forms of media in the communication of information to a user through a data processing system, such as a personal computer. A multimedia application is an application that uses different forms of communications within a single application. For example, multimedia applications may communicate data to a user through a computer via audio and video simultaneously. Such multimedia applications are usually bit intensive, real time, and very demanding, requiring ample processing power in the data processing system. Users may access in the multimedia, for example, in the form of video games or movies on a digital video disk (DVD) or through a communications link.

With MPEG decoding, a system stream containing video and audio packets is received at an input layer. The input layer is used to read data into an internal buffer that can be processed. The data can be retrieved either by file reads or through a network client passing data. The end result is a buffer that can be processed and parsed by the system layer. The system layer will take the data in the input buffer and parse the data until it hits packet starts. MPEG data is comprised of a system stream that contains multiple packets. These packets may be audio or video data packets. Each audio or video packet is designated by a packet start and followed immediately after by packet information such as the packet type, audio or video, length of the packet and possibly PTS values. Past this descriptive information is the data that will be sent to the respective audio and video decoders. The amount of data sent is based on the packet length that is decremented as the packet information is processed and skipped over.

For many MPEG applications, data rates are very high and video decoding is where most of the processing power is required. It is desirable to efficiently process audio as well as to continue to process video to improve frame rates. In some instances, audio underruns may occur causing undesirable effects in the multimedia presentation. Therefore, it would be advantageous to have an improved method and apparatus for processing multimedia data streams.

SUMMARY OF THE INVENTION

It is one objective of the present invention to provide an improved data processing system.

It is another objective of the present invention to provide a method and apparatus for processing a data stream.

It is yet another objective of the present invention to provide a method and apparatus for processing a data stream including audio and video data.

The foregoing objectives are achieved as is now described.

The present invention provides a method and apparatus for processing a data stream including audio and video data in which high data rates and throughput is required. Thresholds are employed to control the processing of video and audio data in a data stream. Video data is decoded in response to a comparison of audio and video data to threshold values. Additionally, another threshold value is employed to control buffers storing audio data in response to an underflow of audio data.

Additionally, these thresholds may be dynamically changed in response to configurations present on different processing systems.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a diagram of an input buffer according to the present invention.

DETAILED DESCRIPTION OF THE PREFERRED EMBODIMENT

Figure 1A:
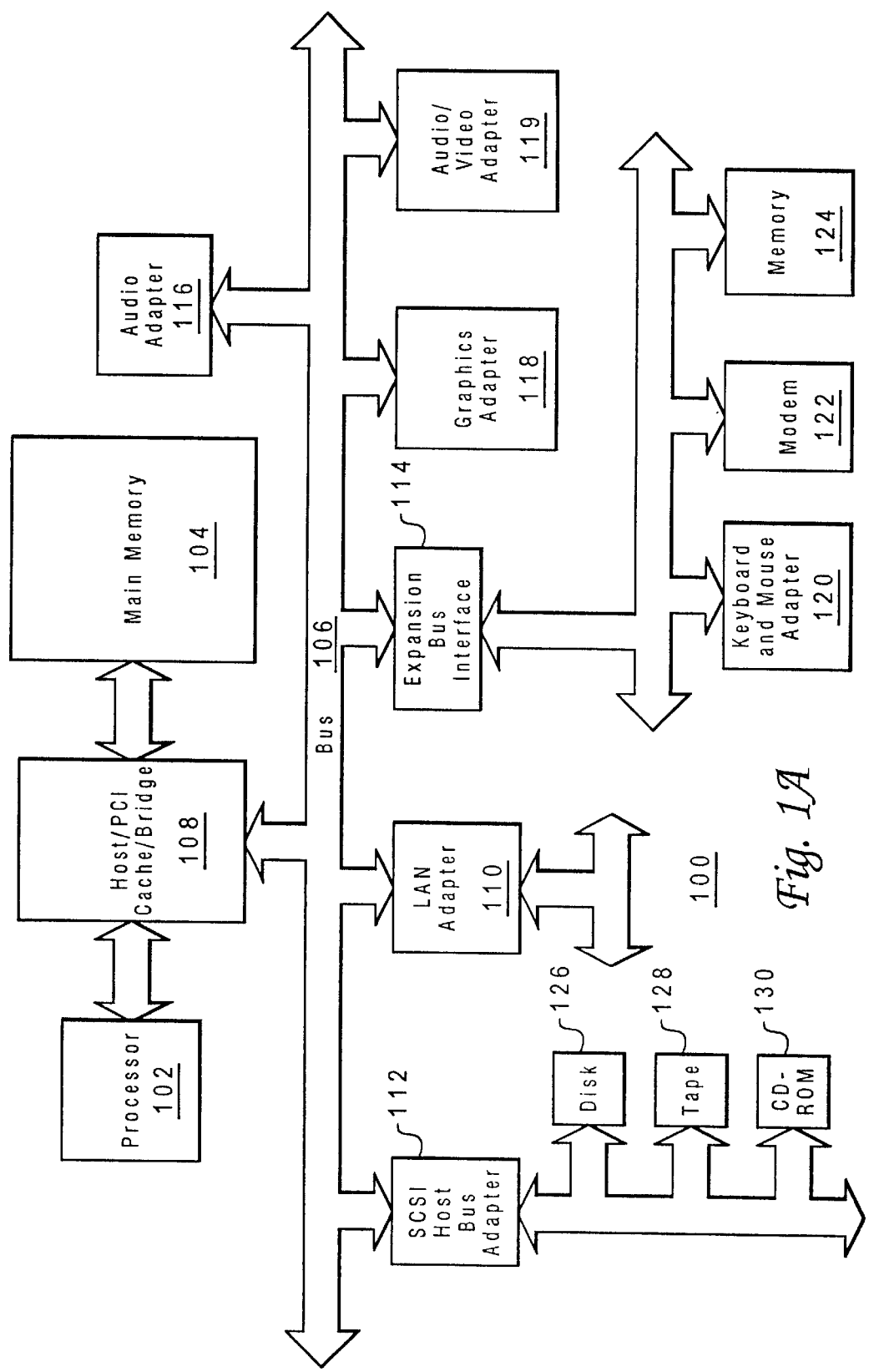
FIG. 1A is a block diagram of a data processing system in the present invention may be implemented.

With reference now to the figures, and in particular with reference to FIG. 1A, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. The depicted example includes four loads on the mother board and three expansion slots. Those of ordinary skill in the art will appreciate that the hardware in FIG. 1A may vary. For example, other peripheral devices, such as optical disk drives and the light may be used in addition to or in place of the hardware depicted in FIG. 1A. The depicted example is not meant to imply architectural limitations with respect to the present invention.

Figure 1B:
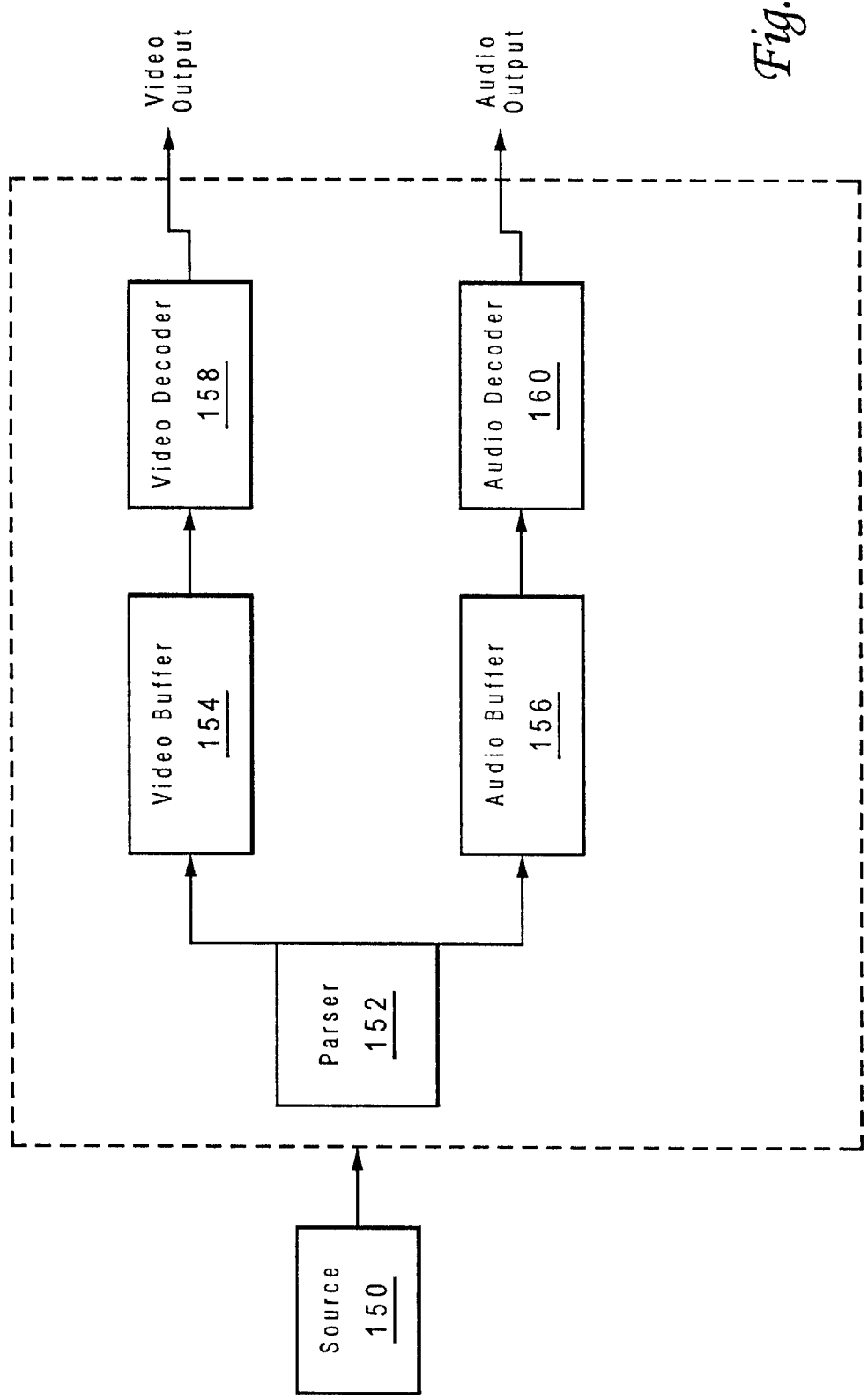
FIG. 1B is a block diagram of a audio/video adapter in which the present invention may be implemented.

In FIG. 1B, a block diagram of a audio/video adapter is depicted from FIG. 1A according to the present invention. A/V adapter 119 has an input connected to source 150 which may be a digital storage media, such as hard disk 126 or CD-ROM 130. Alternatively, source 150 may be a data stream from a remote source received through LAN adapter 110. Parser 152 separates video data from audio data with video data being sent to video buffer 154 and audio data being sent to audio buffer 156. Video decoder 158 is employed to synchronize and decode or drop video frames to produce a video output. Audio decoder 160 is employed to decode audio to create an audio output for the multimedia presentation. The decoding performed by A/V adapter 119 may be implemented using the MPEG standard. The processes of the present invention may be implemented within A/V adapter 119.

Figure 1C:
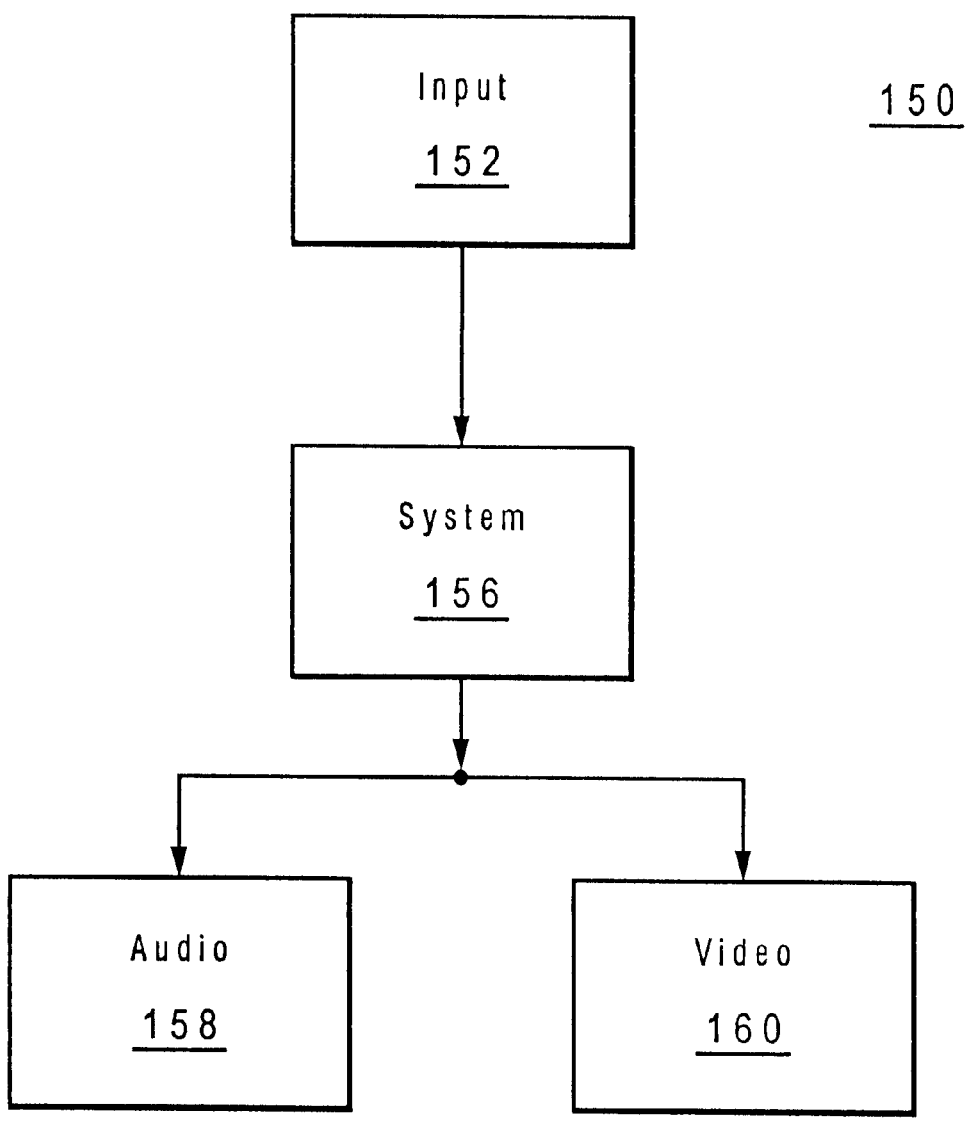
FIG. 1C is a functional block diagram of a system for processing multimedia data according to the present invention.

With reference now to FIG. 1C, a functional block diagram of a system for processing multimedia data is depicted according to the present invention. In particular, system 150 is suitable for processing MPEG-1 and MPEG-2 data streams. System 150 includes an input layer 152, which is employed to read new data into a buffer 154 for processing. The amount of new data read into buffer 154 is equal to the amount of free space in buffer 154. System layer 156 parses new data into audio packets and video packets. Thereafter, audio layer 158 and video layer 160 process the packets. Specifically, audio layer 158 decodes audio packets and sends the data to the hardware for presentation to a user. Video layer 160 decodes video packets up to one frame before presenting them to the user.

With decoding of audio and video, thresholds are employed to improve performance according to the present invention. To avoid audio underruns, an audio threshold is used. On audio callbacks, if no data is available to write to the hardware, then an underrun recovery would not start until a threshold buffer count had been reached where no data was written. To obtain better frame rates, other system thresholds are employed in the system parsing layer so that when the thresholds are reached, additional parsing is stopped so that more time can be spent in decoding the video. The combination of the audio threshold and the system thresholds reduces the problem of both audio breakup from underruns and improved video frame rates. The thresholds depicted in the examples are values that can be tuned and changed based on the configuration of the data processing system so that on faster configuration, the thresholds can be increased and on slower data processing system configurations, the thresholds can be decreased. The audio callback threshold and the system threholds (for video packets and audio packets) described herein provide a balance in processing of multimedia data streams so that no significant amount of time in any given layer (input, system, audio, or video) is spent in processing multimedia data for presentation to a user.

Figure 2:
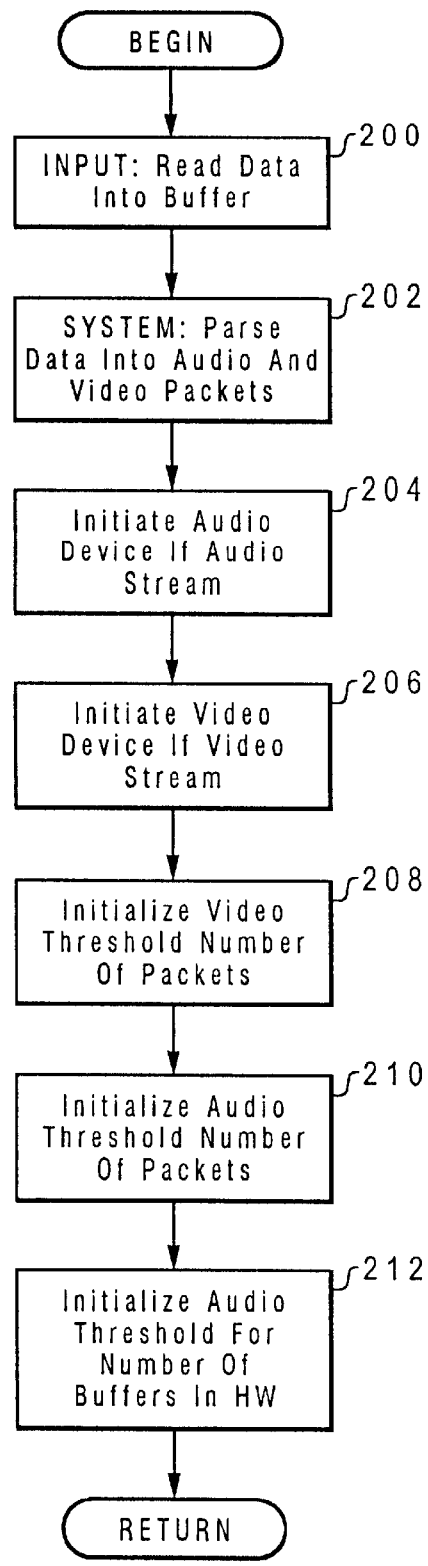
FIG. 2 is a flowchart of a process for initializing video and audio streaming with high data rates according to the present invention.

Turning now to FIG. 2, a flowchart of a process for initializing video and audio streaming with high data rates is depicted according to the present invention. The process begins with an input in which data is read into a buffer (step 200). Thereafter, the system parses data read into the buffer into audio and video packets (step 202). The audio device is initiated if an audio stream is present (step 204) and the video device is initiated if a video stream is present (step 206). Thereafter, the video threshold for the number of packets is initialized (step 208) and the audio threshold number of packets is initialized (step 210). Thereafter, the audio threshold for the number of buffers in the hardware for processing audio data packets is initialized (step 212) with process terminating thereafter.

Figure 3:
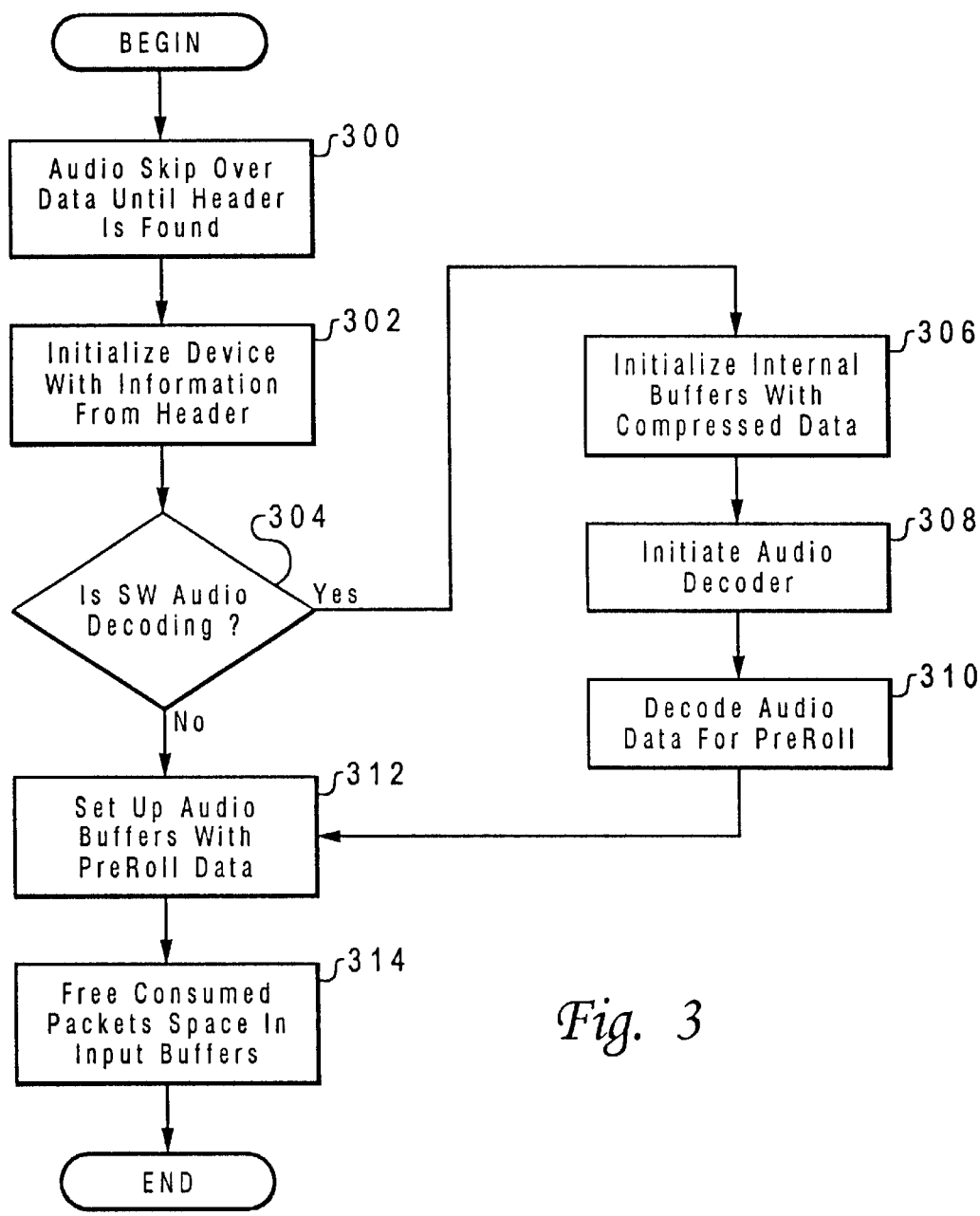
FIG. 3 is a flowchart of a process for initializing an audio device according to the present invention.

With reference now to FIG. 3, a flowchart of a process for initializing an audio device is depicted according to the present invention. FIG. 3 is a more detailed description of step 204 in FIG. 2. The process begins by skipping over audio data until a header is found (step 300). The process then initializes the audio device with information from the header (step 302). Then, a determination is made as to whether software audio decoding is to occur (step 304). If software audio decoding is to occur, the process then initializes internal buffers with compressed data (step 306). Then, the audio decoder is initialized (step 308) and the audio data is decoded (step 310). Next, the audio buffers are set up with data decoded audio data (step 312). With reference again to step 304, if software audio decoding is not to occur, the process proceeds directly to step 312. From step 312, the process frees consumed packets and space in the input buffer (step 314) with process terminating thereafter.

Figure 4:
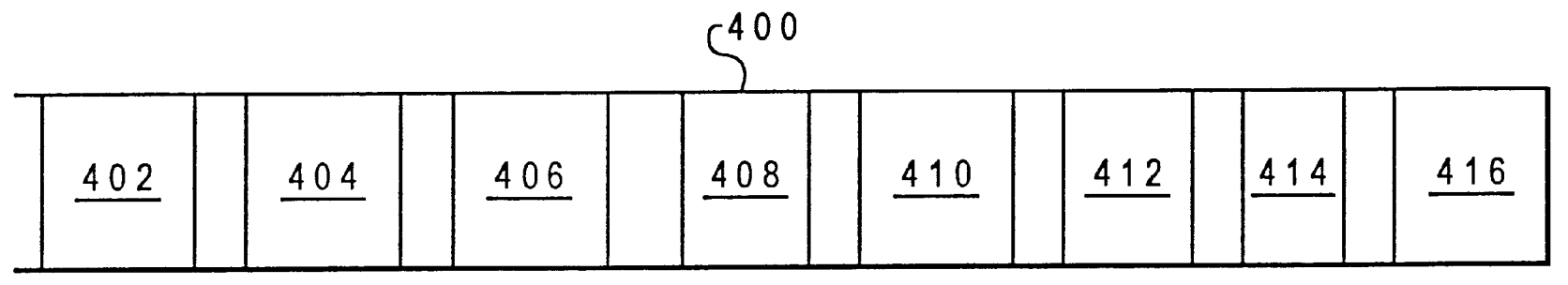

With reference to FIG. 4, a diagram of an input buffer is illustrated according to the present invention. Data from a data stream is stored in input buffer 400 and divided into packets. Input buffer 400 contains data packets 402–416. Data packets 402, 406, 408, and 410 are video packets while data packets 404, 412, 414, and 416 are audio packets. When data packets 402–416 are released, data can be read up through data packet 416 and more packets can be created from new data.

Figure 5:
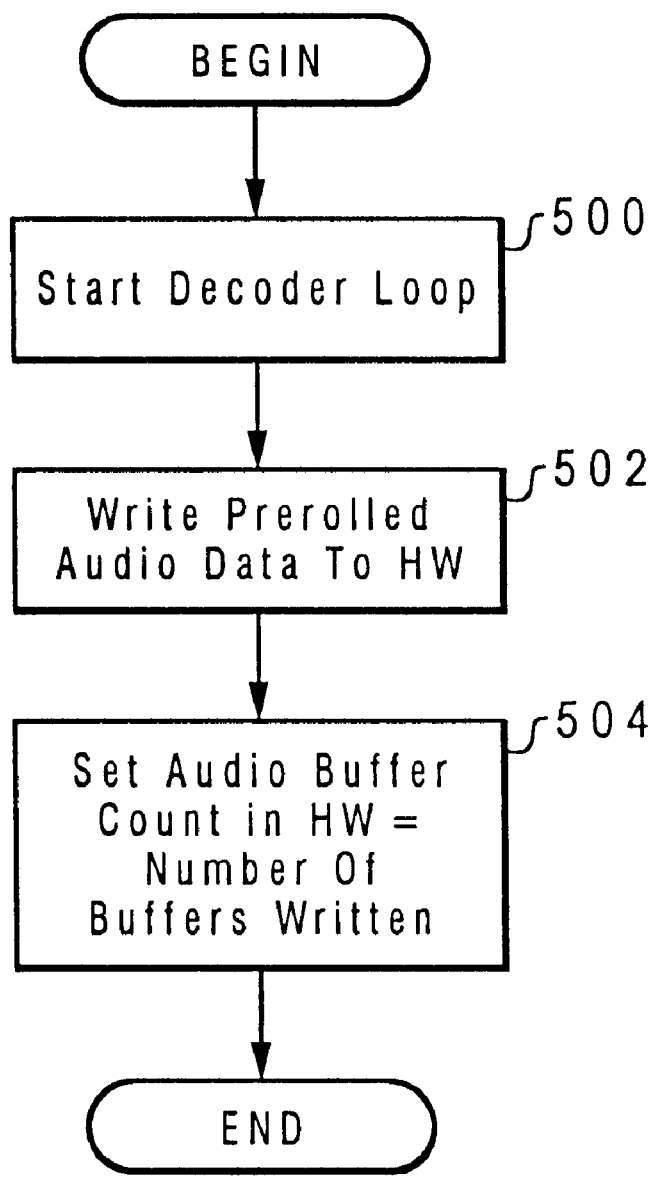
FIG. 5 is a flowchart of a process for starting playback according to the present invention.

With reference now to FIG. 5, a flowchart of a process for starting playback is depicted according to the present invention. The process begins by starting a decoder loop (step 500). Thereafter, pre-rolled audio data is written to the audio hardware device (step 502). Pre-rolled data is pre-decoded data that is set up in the buffers but not yet sent in the hardware for processing. Then, the audio buffer count in the hardware device is set equal to the number of buffers written (step 504) with the process terminating thereafter.

Figure 6:
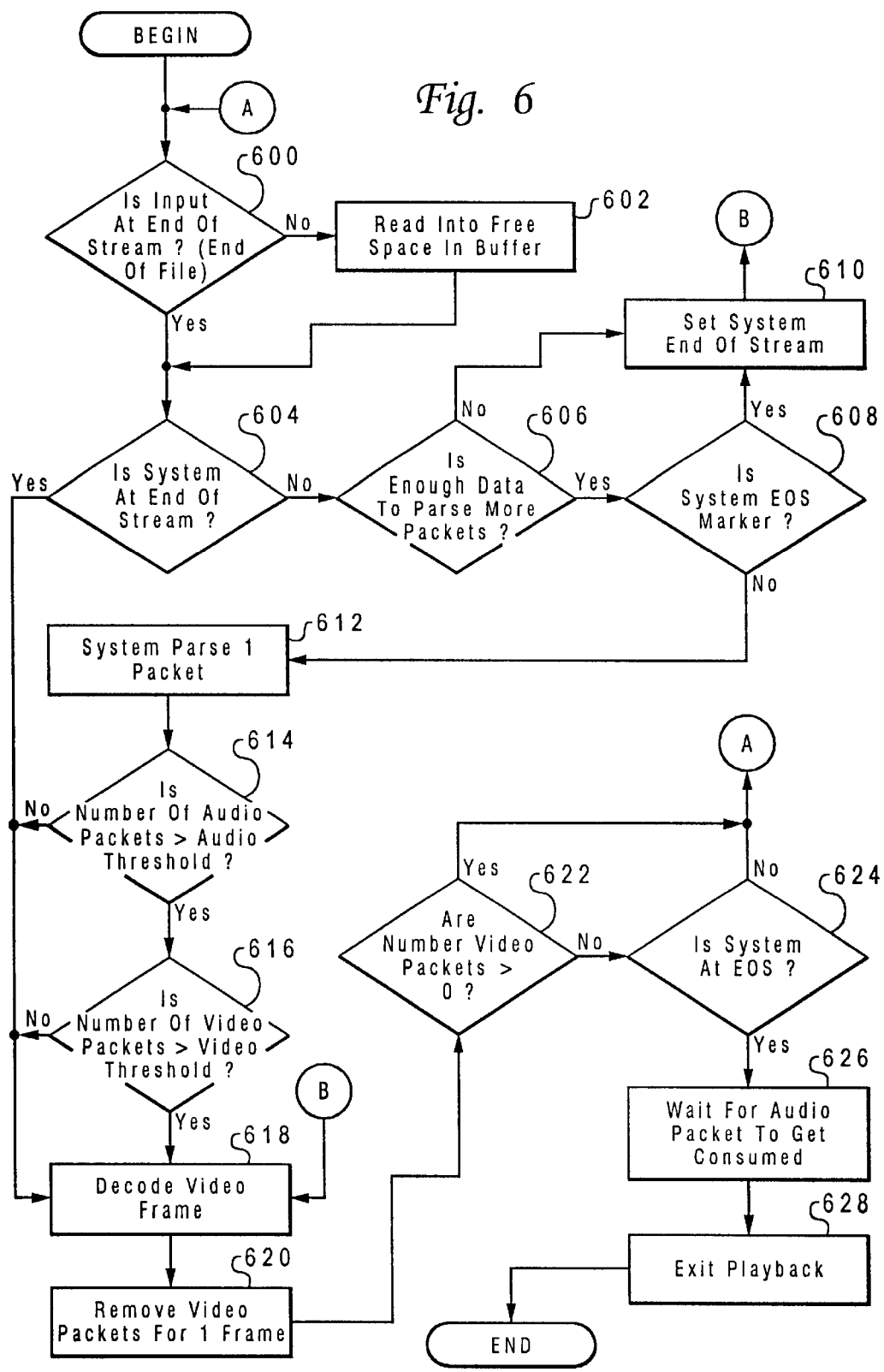
FIG. 6 is a flowchart of a decoder loop according to the present invention.

With reference now to FIG. 6, a flowchart of a decoder loop is depicted according to the present invention. FIG. 6 is a more detailed description of step 500 in FIG. 5. The process begins by determining whether the input can read more data (step 600). If the input is not at the end of stream, additional data is present for reading. If the input has more data to read, the process then reads more data into free space in the buffer (step 602). Otherwise, the process determines whether the system layer has more data to parse (step 604). The process also proceeds to step 604 from step 602. If the system has no more data to parse, a determination is then made as to whether enough data is present to parse into additional packets (step 606). If more data is available to parse into packets, a determination is made as to whether a system end of stream marker is present (step 608). If the system is at the end of stream marker, the process then sets the system to the end of the stream (step 610) with the process proceeding to step 618 as described below. The process also proceeds directly to step 610 if insufficient data is available to parse into additional packets. With reference again to step 608, if the system is not at the end of stream marker, the process then parses one packet from the data (step 612). The process also proceeds to step 612 directly from step 604, if the system is at the end of stream.

From step 612, a determination is made as to whether the number of audio packets is greater than the audio threshold (step 614). If the number of audio packets is not greater than the audio threshold, the process returns to step 604 as described above. Otherwise, the process determines whether the number of video packets is greater than the video threshold (step 616). If the number of video packets is not greater than the threshold, the process also returns to step 604. If, however, the number of video packets is greater than the video threshold, the process then decodes a single video frame (step 618). Thereafter, the video packets are removed for the decoded frame (step 620). Next, a determination is made as to whether the number of video packets is greater than zero (step 622). If the number of video packets is greater than zero, the process then returns to step 600, otherwise, a determination is made as to whether the system is at the end of stream (step 624). If the system is at the end of stream, the process returns to step 600, otherwise, the process waits for audio packets to be consumed (step 626) with the process then exiting the playback mode (step 628) with the process then terminating.

Figure 7:
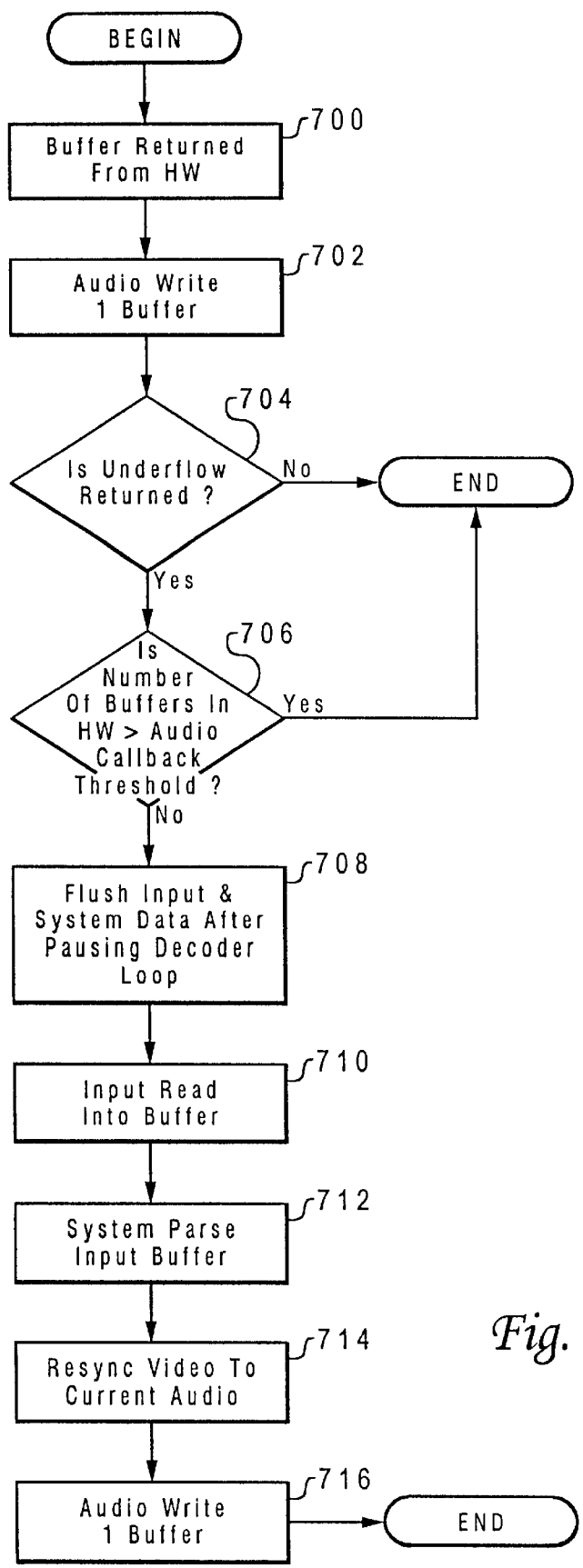
FIG. 7 is a flowchart of a process for performing audio callback according to the present invention.

With reference now to FIG. 7, a flowchart of a process for performing audio callback is depicted according to the present invention. The process begins by returning a buffer from the hardware (step 700). Next, an audio write to one buffer is performed (step 702). Next, a determination is made as to whether an underflow is returned from the hardware (step 704). If an underflow is not returned, the process then terminates. Otherwise, a determination is made as to whether the number of buffers in the hardware is greater than the audio callback threshold (step 706). If the number of buffers in the hardware is not greater than the audio callback threshold, the process then flushes the input and system data after pausing the decoder loop (step 708). Then, input is read into the buffer (step 710) and the system parses the input buffer (step 712). Thereafter, the process resyncs the video to the current audio (step 714). In other words, the process skips video until it matches the current audio time stamps in the buffer. Then, an audio write is performed into a buffer (step 716) with the process terminating thereafter. Different audio callback thresholds may be used depending on whether software or hardware decoding. Less buffers are needed with hardware decoding of audio data. If underflow recovery is not desired, then silent data may be copied in audio buffers and sent to hardware to prevent audio breakup instead of flushing input and system data.

Figure 8:
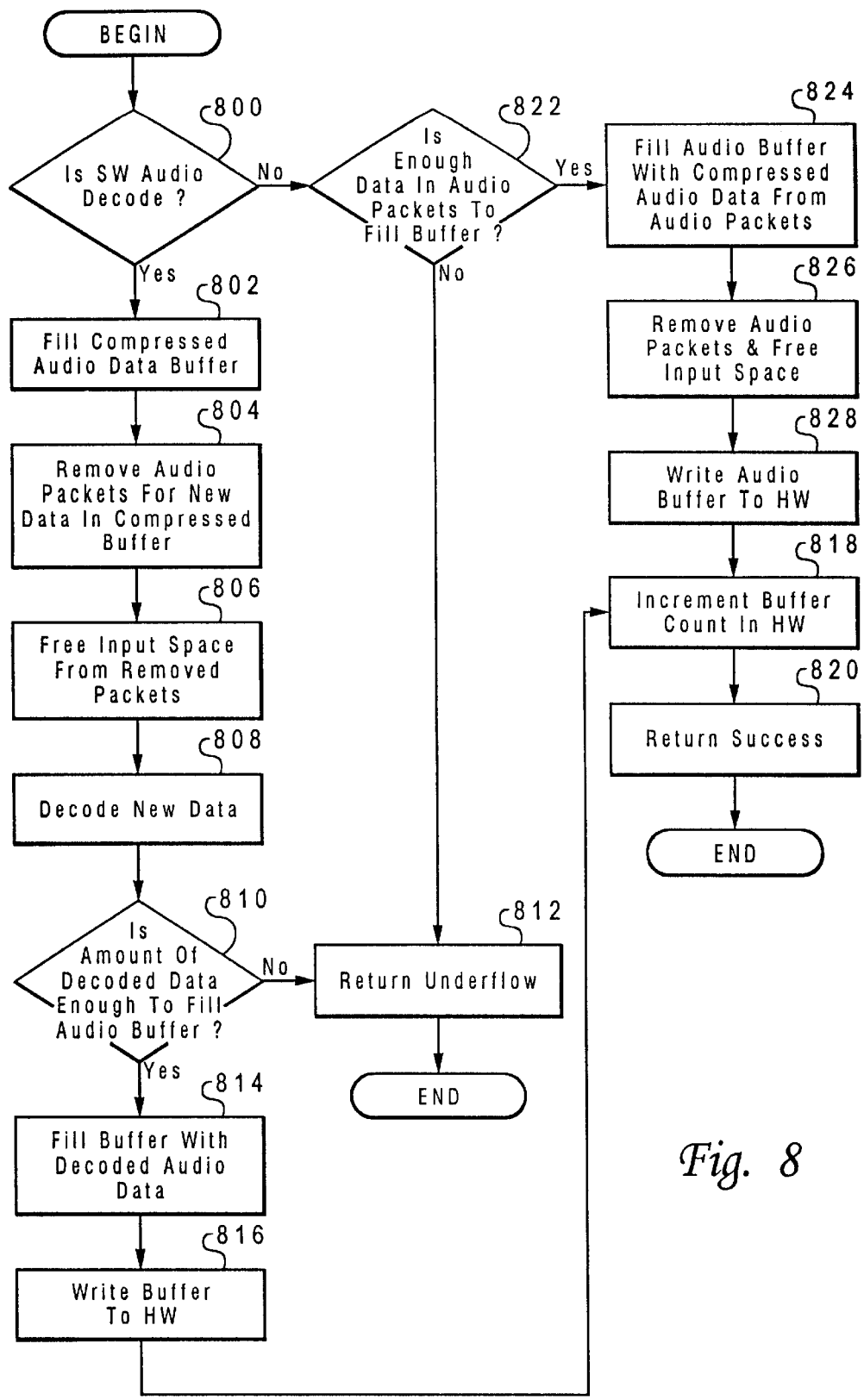
FIG. 8 is a flowchart of a process for performing an audio right into one buffer according to the present invention.

With reference now to FIG. 8, a flowchart of a process for performing an audio write into one buffer is depicted according to the present invention. The flowchart is a more detailed description of step 702 in FIG. 7. The process begins by determining whether software audio decode is present (step 800). If software audio decode is present, the process then fills compressed audio data into a buffer (step 802). Next, audio packets are removed for new data in the compressed buffer (step 804). The audio packets are freed as data is copied into the internal buffer as described below with reference to FIG. 9. Thereafter, input space is freed from the removed packets (step 806) and new data is decoded (step 808).

Then, a determination is made as to whether the amount of decoded data is sufficient to fill an audio buffer (step 810). If insufficient data is present to fill the audio buffer, an underflow is returned (step 812) with the process terminating thereafter. Otherwise, the process fills the buffer with the decoded audio data (step 814). Then, the data in the buffer is written to the hardware (step 816). Next, the buffer count in the hardware is incremented (step 818) and an indication of success is returned (step 820).

With reference again to step 800, if software audio decode is not present, the process then determines whether sufficient data in the audio packets are present to fill the buffer (step 822). If insufficient data is present, the process proceeds to step 812 as described above. Otherwise, the audio buffer is filled with compressed audio data from the audio packets (step 824). Then, the audio packets are removed and input space is freed (step 826). Then, the data in the audio buffer is written to the hardware (step 828) with the process then proceeding to step 818 as previously described.

Figure 9:
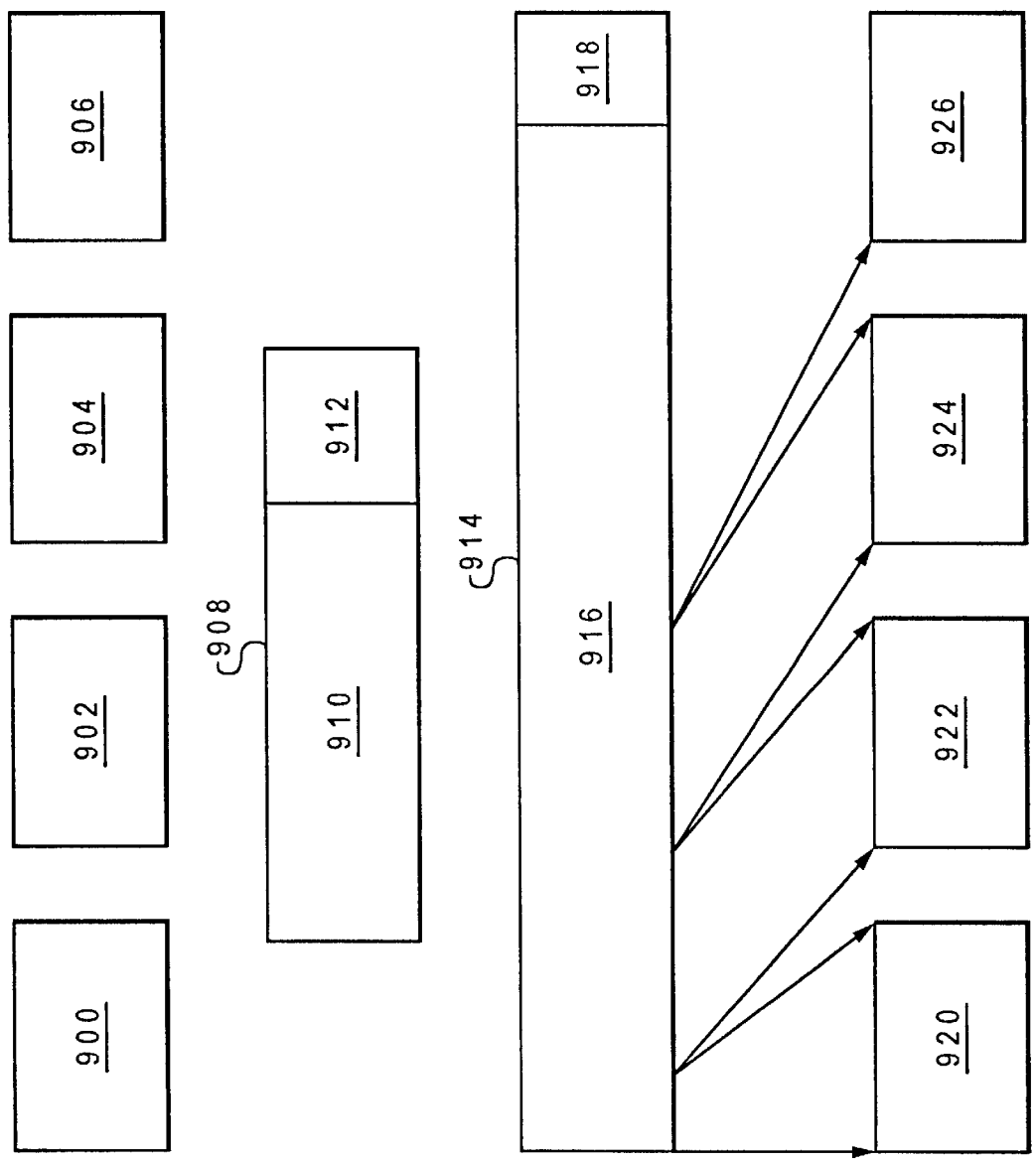
FIG. 9 is a block diagram illustrating the processing of audio packets according to the present invention.
Figure 2:
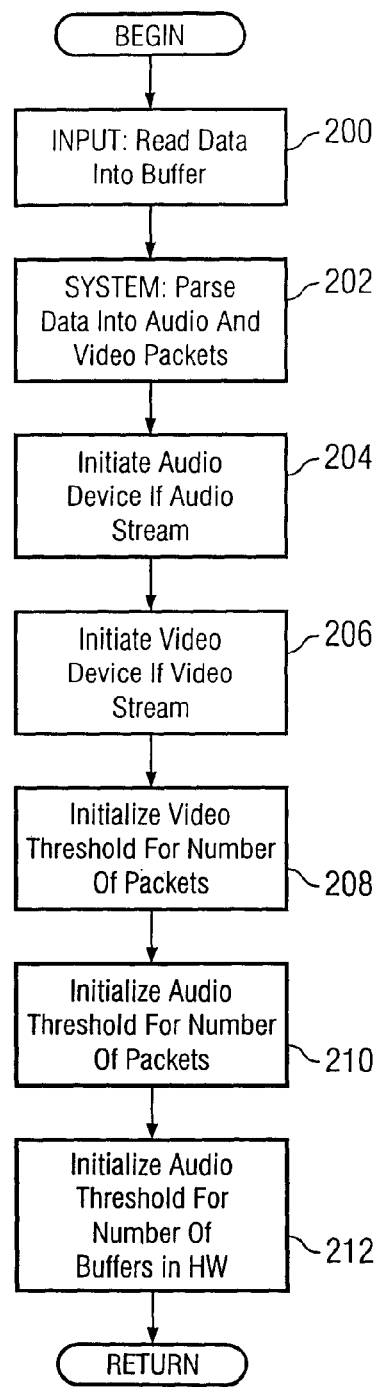
Figure 6:
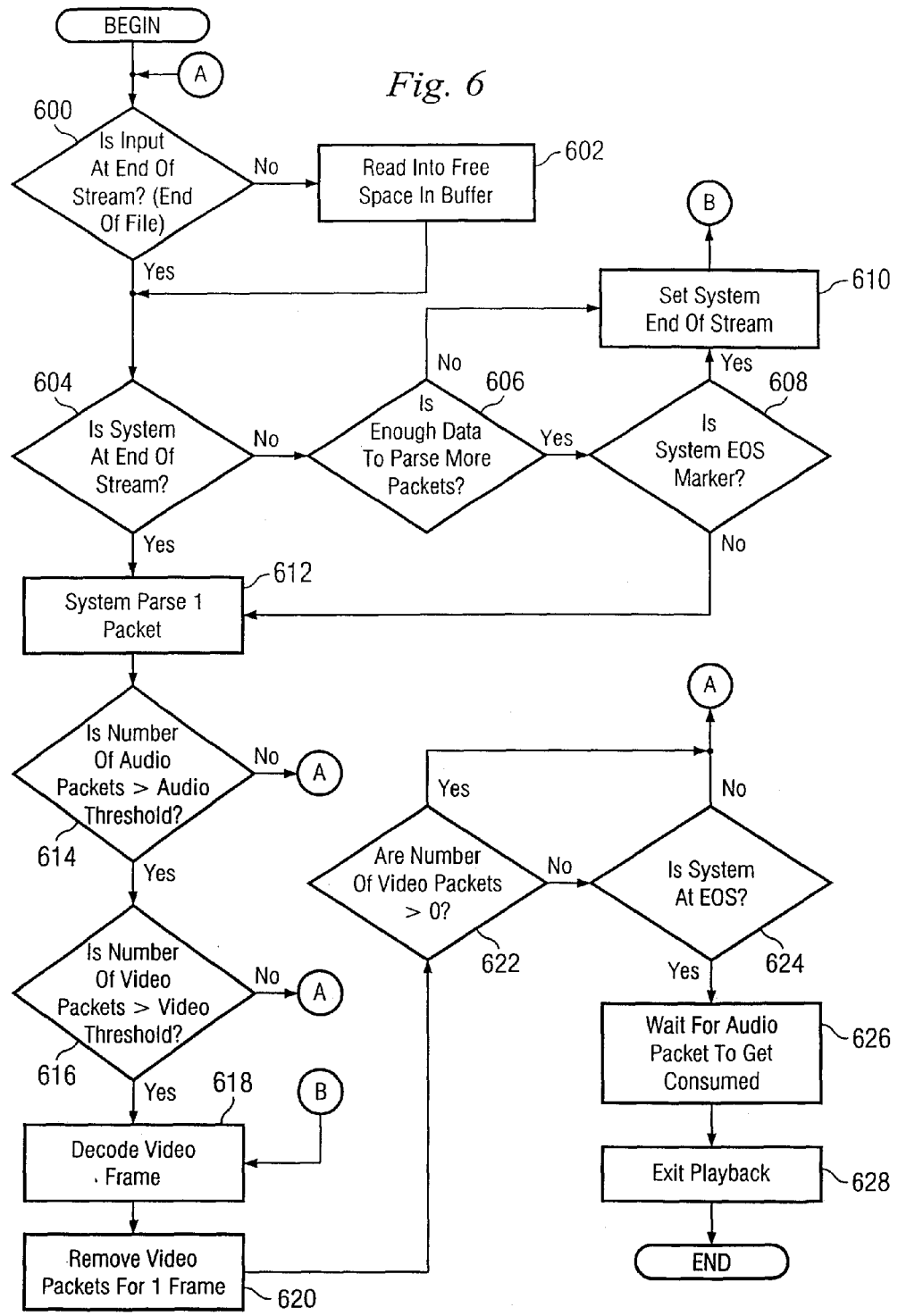
Figure 8:
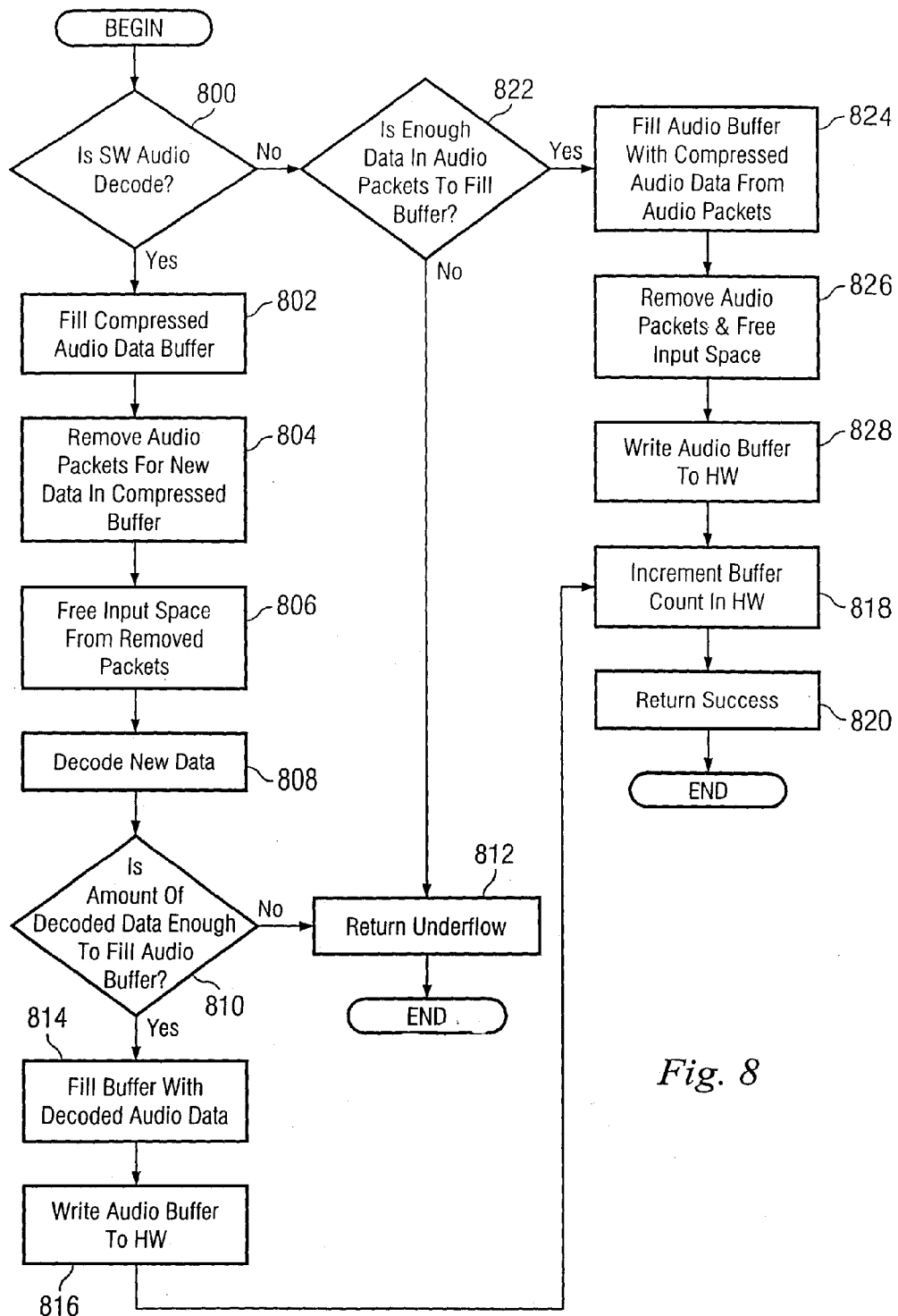

Turning to FIG. 9, a block diagram illustrating the processing of audio packets is depicted according to the present invention. Audio packets 900, 902, 904, and 906 are copied into internal buffer 908 in section 910. Section 912 in internal 908 remains unused in the depicted example. The data in section 910 is decoded with the decoded data being stored in internal buffer 914 in section 916. Section 918 in internal buffer 914 remains unused. The decoded data is then sent to the hardware for presentation in buffers 920, 922, 924, and 926.

In the depicted example, the buffers used for input are circular buffers. Thus, if an audio packet is freed from the buffer before a video packet located before the audio packet, no free space is available unless the video packet before the audio packet also is freed. Thus, video decoding is not interrupted so that video packets can be pulled out of the buffer to free input space to read in more data and to hopefully parse more audio packets for processing.

In the depicted example, hardware MPEG support has improved playback specifically in MPEG-2 decoding which is very video intensive and where each video frame is usually greater than 50K bytes of data. For hardware audio support, fewer buffers are employed during playback and in the depicted example, only seventy-five percent of the buffers are needed to be filled with data to prevent audio breakup after playback has started. In the depicted example, the threshold for audio is seventy-five percent of the existing audio buffers and the threshold for system and read in the video decoding is seventy-five percent of the packets processed with at least one audio packet available at all times.

The present invention may be implemented to process different types of MPEG data streams. For example, the processes of the present invention may be implemented in an MPEG-1 data stream defined under ISO/IEC 11172 from the International Organization for Standardization and the International Electronics Commission. MPEG-2 data streams also may be processed by the present invention and are defined under ISO/IEC 13818. Additionally, the present invention may be employed to process other types of data streams containing audio and video data.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

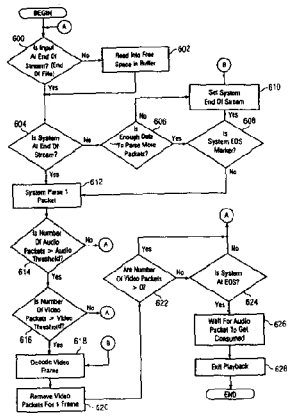

What is claimed is:

1. A method in a data processing system for dynamically synchronizing a data stream, the method comprising:
    receiving the data stream;
    parsing the data stream into packets to form a plurality of packets, wherein the plurality of packets includes audio packets and video packets;
    comparing the plurality of packets to a threshold as packets are added to the plurality of packets; and
    selectively decoding of audio packets and video packets based on a result from the comparison of the plurality of packets to the threshold.

2. The method of claim 1, wherein the threshold includes a first threshold value and a second threshold value and wherein the comparing step comprises comparing the audio packets to the first threshold value and comparing the video packets to the second threshold value.

3. The method of claim 2, wherein the decoding of audio packets and video packets comprises decoding a video packet if a number of audio packets is greater than the first threshold and if the number of video packets is greater than the second threshold value.

4. The method of claim 1, wherein the data stream is a MPEG-1.

5. The method of claim 1, wherein the data stream is a MPEG-2 data stream.

6. The method of claim 1 further comprises:
    halting parsing of the data stream in response to comparing the plurality of packets to a threshold as packets are added to the plurality of packets.

7. A method in a data processing system for dynamically synchronizing a data stream, the method comprising:
    receiving a data stream;
    parsing the data stream into a plurality of packets;
    identifying a number of video packets within the plurality of packets while parsing the data stream into the plurality of packets;
    comparing the number of video packets to a video threshold value; and
    decoding the video packets in response to the number of video packets being greater than the video threshold value.

8. The method of claim 7, wherein the data processing system includes an amount of processing resources and further comprising:
    identifying the amount of processing resources within the data processing system; and
    adjusting the video threshold value in response to the identified amount of processing resources within the data processing system.

9. The method for claim 7 further comprising:
    monitoring the plurality of packets for audio packets;
    identifying a number of audio packets within the plurality of packets;
    determining whether the number of audio packets is greater than an audio threshold value in response to a determination that the number of video packets is greater than the video threshold value; and
    starting the decoding step when the number of video packets is greater than the audio threshold value.

10. The method of claim 9, wherein the data processing system includes an amount of processing resources and further comprises:
    identifying the amount of processing resources within the data processing system; and
    adjusting the video threshold value and the audio threshold value in response to the identified amount of processing resources within the data processing system.

11. The method of claim 10, further comprising:
    identifying a number of audio packets within the plurality of packets;
    storing data from the audio packets in a number of available buffers;
    comparing the number of available buffers to a threshold value; and
    processing the data stored in the available buffers in response to the number of available buffers being greater than the threshold value.

12. The method of claim 11 further comprising:
    flushing data from the available buffers in response to the number of available buffers being less than or equal to the threshold value.

13. The method of claim 7 further comprises:
    halting parsing of the data stream in response to comparing the plurality of packets to a threshold as packets are added to the plurality of packets.

14. An apparatus for decoding a data stream comprising:
    input means for receiving the data stream;
    processing means for parsing the data stream into a number of video data packets and a number of audio data packets;
    video decoding means for decoding the number of video data packets;
    audio decoding means for decoding the number of audio data packets; and
    processing control means for controlling the processing means, wherein the processing means is halted in response to the number of video data packets being greater than a first threshold value.

15. The apparatus of claim 14, wherein the data processing system includes an amount of processing resources and further comprises:
    identification means for identifying the amount of processing resources within the apparatus; and adjustment means for adjusting the video threshold value in response to the identified amount of processing resources within the apparatus.

16. The apparatus of claim 14 further comprising:

monitoring means for monitoring the plurality of data packets for a presence of audio data packets;

identification means for identifying a number of audio data packets within the plurality of data packets in response to the monitoring means detecting a presence of audio packets;

determination means for determining whether the number of audio packets is greater than an audio threshold value in response to a determination that the number of video packets is greater than the video threshold value; and second processing control means for starting decoding of video packets in response to a determination that the number of video packets is less than or equal to the audio threshold value.

17. The apparatus of claim 14, wherein the apparatus is a data processing system.

18. The apparatus of claim 14, wherein the apparatus is an audio/visual adapter.

19. The apparatus of claim 14, wherein the data stream is a MPEG-1 data stream.

20. The apparatus of claim 14, wherein the data stream is a MPEG-2 data stream.

21. A method in a data processing system for decoding a multimedia data stream, the method comprising:

receiving the multimedia data stream;

parsing the multimedia data stream into packets to form a plurality of packets, wherein the plurality of packets includes audio packets and video packets;

comparing the plurality of packets to a threshold as packets are added to the plurality of packets; and selectively decoding of audio packets and video packets based on a result from the comparison of the plurality of packets to the threshold.

22. A method in a data processing system for decoding a multimedia data stream of claim 21, further comprising:

halting parsing of the data stream in response to comparing the plurality of packets to a threshold as packets are added to the plurality of packets.

23. A computer program product for use with a data processing system for processing a data stream, the computer program product comprising:

a computer useable medium;

first instructions for receiving a data stream;

second instructions for parsing the data stream into data packets to form a plurality of packets;

third instructions for comparing the plurality of packets to a threshold as data packets are added to the plurality of packets;

fourth instructions for selectively decoding audio and video packets based on a result from the comparison of the plurality of packets; and wherein the instructions are embodied within the computer useable medium.

24. A computer program product for use with a data processing system for processing a data stream of claim 23, further comprising:

fifth instructions for halting parsing of the data stream.

25. A method in a data processing system for dynamically, synchronizing a data stream, the method comprising:

receiving the data stream;

parsing the data stream into packets to form a plurality of packets, wherein the plurality of packets includes audio packets and video packets;

comparing the audio packets to a first threshold as packets are added to the plurality of packets;

comparing the video packets to a second threshold as packets are added to the plurality of packets;

halting parsing of the data stream based on a result from the comparison of the plurality of packets to the thresholds; and selectively decoding of audio packets and video packets based on a result from the comparison of the plurality of packets to the thresholds.

* * * * *

UNITED STATES PATENT AND TRADEMARK OFFICE
CERTIFICATE OF CORRECTION

PATENT NO.    : 6,546,426 B1
DATED         : April 8, 2003
INVENTOR(S)   : Post

It is certified that error appears in the above-identified patent and that said Letters Patent is hereby corrected as shown below:

The title page should be deleted to appear as per attached title page.

The sheets of drawings consisting of figures 2, 6 and figure 8 should be deleted to appear as per attached figures 2, 6 and 8.

Signed and Sealed this

Seventh Day of October, 2003

JAMES E. ROGAN
*Director of the United States Patent and Trademark Office*

(12) United States Patent
Post

(10) Patent No.: US 6,546,426 B1
(45) Date of Patent: Apr. 8, 2003

(54) METHOD AND APPARATUS FOR EFFICIENTLY PROCESSING AN AUDIO AND VIDEO DATA STREAM

(75) Inventor: Lauren Lee Post, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 08/821,938

(22) Filed: Mar. 21, 1997

(51) Int. Cl.[7] ............... G06F 15/16; H04N 7/04
(52) U.S. Cl. ........................... 709/231; 725/89
(58) Field of Search .................. 709/219, 231, 709/248; 725/89

(56) References Cited

U.S. PATENT DOCUMENTS

| | | | |
|---|---|---|---|
| 4,994,912 A | 2/1991 | Lumelsky et al. | 358/140 |
| 5,289,276 A | 2/1994 | Siracusa et al. | 348/467 |
| 5,473,385 A | 12/1995 | Leske | 348/500 |
| 5,483,287 A | 1/1996 | Siracusa | 348/426 |
| 5,502,493 A | 3/1996 | Meyer | 348/426 |
| 5,510,845 A | 4/1996 | Yang et al. | 348/476 |
| 5,515,107 A | 5/1996 | Chiang et al. | 348/473 |
| 5,548,704 A | 8/1996 | Steiner et al. | 395/158 |
| 5,555,024 A | 9/1996 | Limberg | 348/473 |
| 5,555,275 A | 9/1996 | Oshima | 375/261 |
| 5,559,999 A | 9/1996 | Maturi et al. | 395/550 |
| 5,576,902 A | 11/1996 | Lane et al. | 386/68 |
| 5,583,652 A | 12/1996 | Ware | 386/75 |
| 5,598,352 A * | 1/1997 | Rosenau et al. | |
| 5,629,740 A * | 5/1997 | Tanaka et al. | |
| 5,630,005 A * | 5/1997 | Ort | |
| 5,715,176 A * | 2/1998 | Mobini | 709/231 |
| 5,737,531 A * | 4/1998 | Ehley | 709/231 |
| 5,758,076 A * | 5/1998 | Wu et al. | 709/231 |
| 5,784,572 A * | 7/1998 | Rostoker et al. | 709/231 |
| 5,793,980 A * | 8/1998 | Glaser et al. | 709/231 |

OTHER PUBLICATIONS

Information technology—Coding of moving pictures and associated audio for digital storage media at up to about 1,5 Mbit/s—Part 1: Systems; International Standard 11172; First edition, 1993.

Information Technology—Generic Coding Of Moving Pictures And Associated Audio Information: Video; Draft International Standard 0802; Nov. 9, 1994.

Information Technology—Generic Coding of Moving Pictures And Associated Audio: Systems; Draft International Standard 0801; revised Apr. 21, 1995.

OpenMPEG™ Multiplatform MPEG Interactive API Specification Version 1.03; OpenMPEG Consortium; May 9, 1996.

* cited by examiner

*Primary Examiner*—Mark H. Rinehart
*Assistant Examiner*—Marc D. Thompson
(74) *Attorney, Agent, or Firm*—Duke W. Yee; Jeffrey S. LaBaw

(57) ABSTRACT

A method and apparatus for processing a data stream including audio and video data in which high data rates and throughput is required. Thresholds are employed to control the processing of video and audio data in a data stream. Video data is decoded in response to a comparison of audio and video data to threshold values. Additionally, another threshold value is employed to control buffers storing audio data in response to an underflow of audio data.

25 Claims, 11 Drawing Sheets